(12) United States Patent
Alexander

(10) Patent No.: US 7,018,080 B2
(45) Date of Patent: Mar. 28, 2006

(54) SHAPED NEON LIGHT SPARK PLUG CONNECTORS

(76) Inventor: Kevin L. Alexander, 2300 Bayou D'Arbonne Dr., West Monroe, LA (US) 71291

( * ) Notice: Subject to any disclaimer, the term of this patent is extended or adjusted under 35 U.S.C. 154(b) by 36 days.

(21) Appl. No.: 10/697,230

(22) Filed: Oct. 31, 2003

(65) Prior Publication Data

US 2005/0094408 A1    May 5, 2005

(51) Int. Cl.
B62J 6/00    (2006.01)
(52) U.S. Cl. .................. 362/473; 362/216; 362/263; 362/390; 362/640; 362/645
(58) Field of Classification Search ........... 362/217, 362/221, 263, 216, 369, 390, 473–476, 640, 362/645

See application file for complete search history.

(56) References Cited

U.S. PATENT DOCUMENTS

| | | | | |
|---|---|---|---|---|
| 1,536,808 | A | | 5/1925 | Norden ........................ 324/395 |
| 2,188,224 | A | * | 1/1940 | Kathriner .................... 362/225 |
| 2,496,197 | A | | 1/1950 | Buck ............................ 324/395 |
| 2,508,498 | A | * | 5/1950 | Currier .......................... 362/6 |
| 2,665,673 | A | * | 1/1954 | Woofter ...................... 439/125 |
| 3,420,994 | A | * | 1/1969 | Hanson ....................... 362/263 |
| 3,839,671 | A | * | 10/1974 | Gerry .......................... 324/395 |
| 3,906,917 | A | | 9/1975 | Lorti ........................ 123/146.5 |
| 4,224,570 | A | | 9/1980 | Meserow ..................... 324/175 |
| 5,208,541 | A | | 5/1993 | Yerkovich et al. .......... 324/395 |
| 5,598,065 | A | | 1/1997 | Lakosky ....................... 315/77 |
| 5,799,124 | A | | 8/1998 | Zorn et al. .................. 385/125 |
| 6,045,244 | A | | 4/2000 | Dixon et al. ................ 362/500 |
| 6,404,132 | B1 | | 6/2002 | Krumholz ..................... 315/82 |
| 6,761,240 | B1 | * | 7/2004 | Sollitto et al. .............. 362/473 |
| 2003/0164646 | A1 | | 9/2003 | Tooke ......................... 307/50 |

OTHER PUBLICATIONS

"No Magic Neon" "Finest Neon Ignition Tubes", Aug. 2003 website http://nomagic-neon.com/home.html a product on No Magic Neon, Inc. Niskayuna, New York, pp. 1-9.

* cited by examiner

*Primary Examiner*—Alan Cariaso
(74) *Attorney, Agent, or Firm*—John M. Harrison

(57) ABSTRACT

Shaped neon light spark plug connectors which include a continuous length of neon tubing fitted with electrodes at each end and configured to extend between and connect to the spark plug and coil of a motorcycle engine. The spark plug connectors are each characterized by a continuous, shaped neon tube light source that pulsates and flickers with operation of the engine at low engine speeds and displays a substantially continuous glow of a selected color at higher engine speeds. A specially designed jig is provided for bending the heated neon tubing into the desired configuration and fitting it between the spark plug and the coil locations. Included is a method for providing a continuous, shaped neon light spark plug-to-coil connector on a motorcycle engine, which method includes the steps of providing a jig for measuring, cutting and bending a heated neon light tube into a desired configuration and fitting the shaped tube between the coil and the spark plug connectors of a motorcycle; adding electrodes to each end of the neon tube and evacuating the tube; and attaching end connectors and boots on each end of the neon tube for electrical connection to the coil and spark plug terminals of the motorcycle engine.

16 Claims, 4 Drawing Sheets

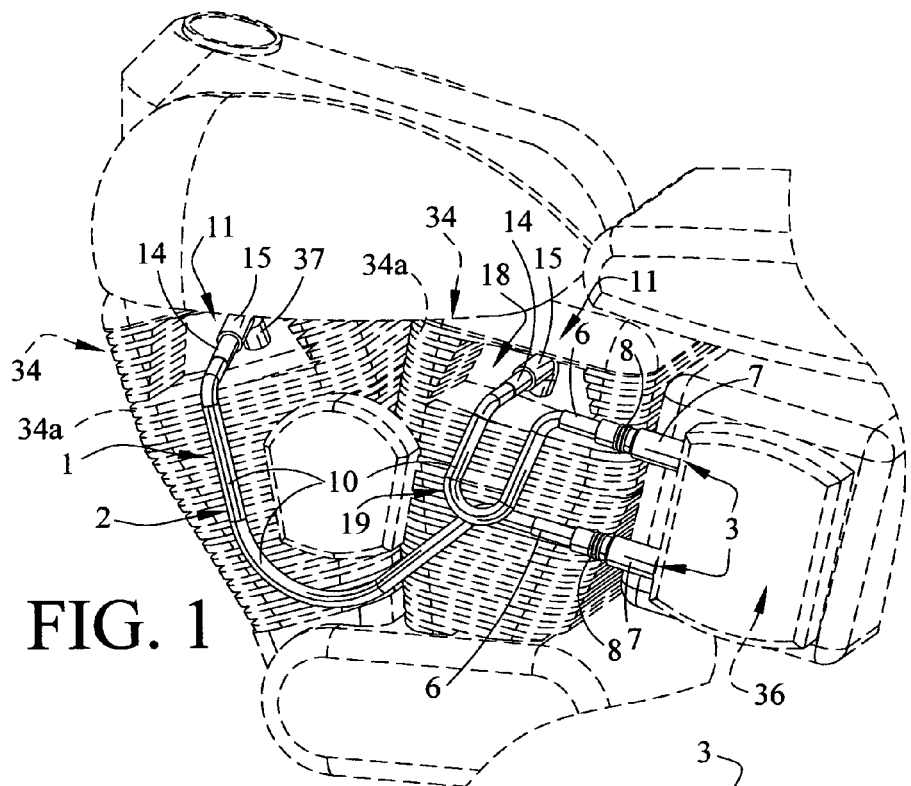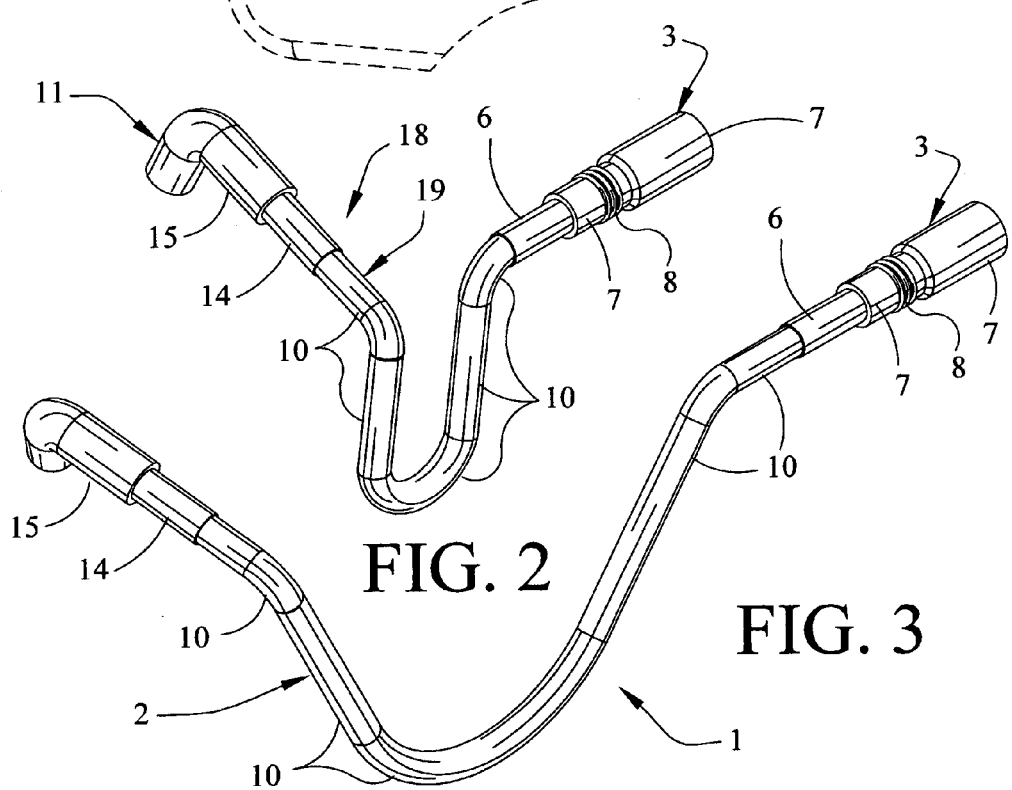

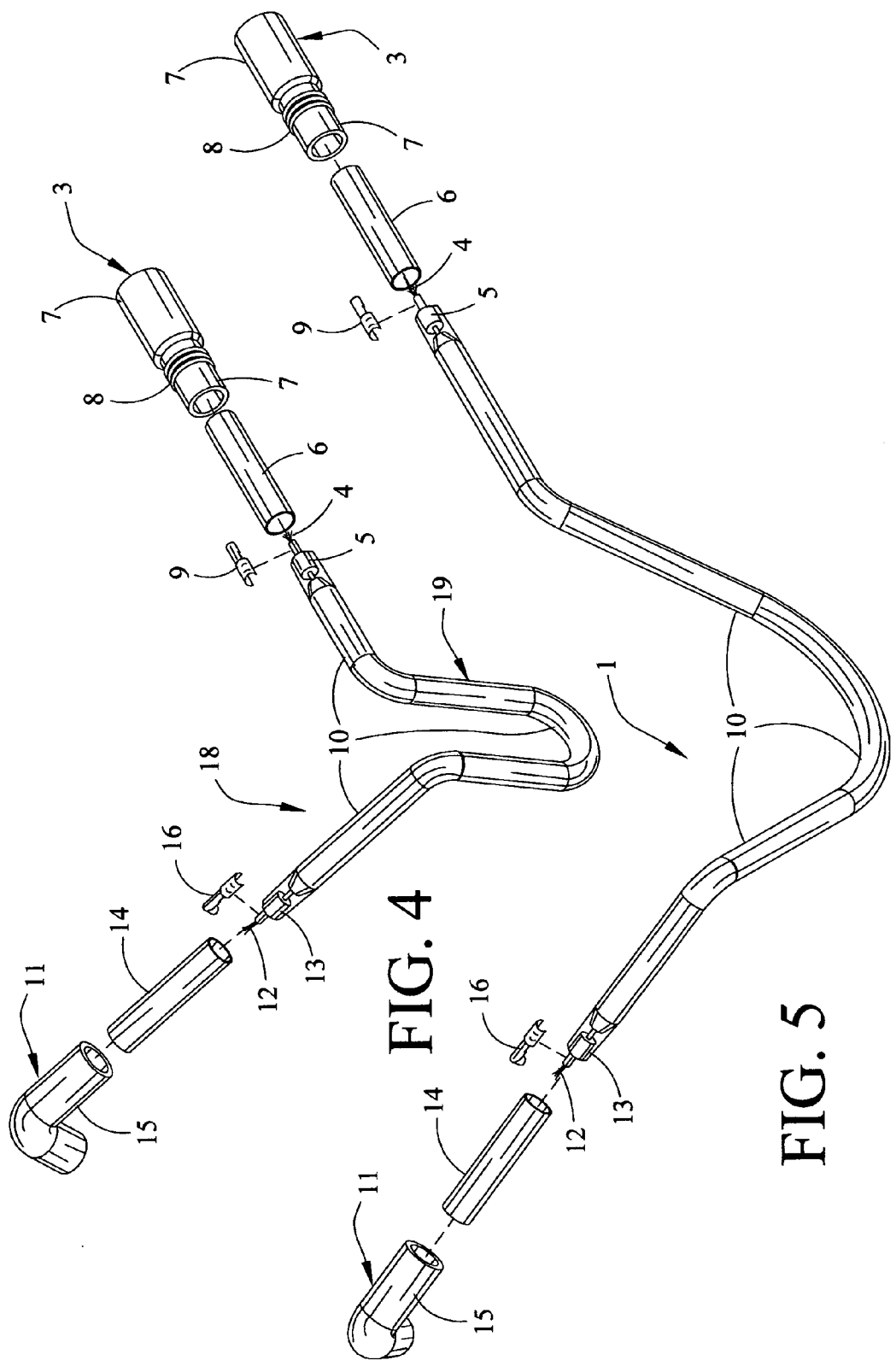

SHAPED NEON LIGHT SPARK PLUG CONNECTORS

SUMMARY OF THE INVENTION

Continuous, shaped neon light spark plug connectors are provided for extending between and electrically connecting a coil connection or connections to a spark plug or plugs of an internal combustion engine such as a motorcycle engine. The connectors include a custom-shaped neon (or mercury vapor) tube (hereinafter called "neon tube" or "neon light tube") of selected length, an electrode provided in each end of the neon tube, with electrical connectors receiving the wiring from the electrodes and protective boots provided on each end of the neon tube for connecting and protecting the electrical connection to the spark plug(s) and coil connection(s) of the motorcycle. Plastic shrink-wrapped tubing may also be fitted on the ends of the neon tubes and over the respective electrode and electrical connector areas, in order to receive and better seal the coil and spark plug connections under the boots and for purposes of esthetics. Also included is a method of providing one or more shaped, continuous neon light spark plug connectors between the spark plug or plugs and coil connection or connections of a motorcycle, which method includes the steps of providing a jig for measuring, cutting and bending a heated length of neon tubing into a selected configuration, attaching electrodes to each end of the neon tube, using a conventional blow hose for shaping the neon tube in the jig, evacuating the neon tube, attaching electrical connectors to the electrode wiring at each end of the neon tube for attachment to the spark plug and the coil and providing optional plastic sleeves, as well as protective rubber boots over the ends of the neon tube to protect the electrical connectors and absorb vibration from the engine. The neon and mercury vapor tubes of this invention are continuous and thus extend between the coil and spark plug terminals, around intervening engine protrusions, without interruption.

BRIEF DESCRIPTION OF THE DRAWINGS

The invention will be better understood by reference to the drawings herein, as follows:

FIG. 1 is a perspective view of a typical installation of two neon light spark plug connectors having different configurations extending between corresponding coil connections and spark plugs of a motorcycle engine (illustrated in phantom);

FIG. 2 is a perspective view of the top one of the neon light spark plug connectors illustrated in FIG. 1;

FIG. 3 is a perspective view of the bottom one of the neon light spark plug connectors illustrated in FIG. 1;

FIG. 4 is an exploded view of the neon light spark plug connector illustrated in FIGS. 1 and 2;

FIG. 5 is an exploded view of the neon light spark plug connector illustrated in FIGS. 1 and 3;

DESCRIPTION OF THE PREFERRED EMBODIMENTS

Figure 6:
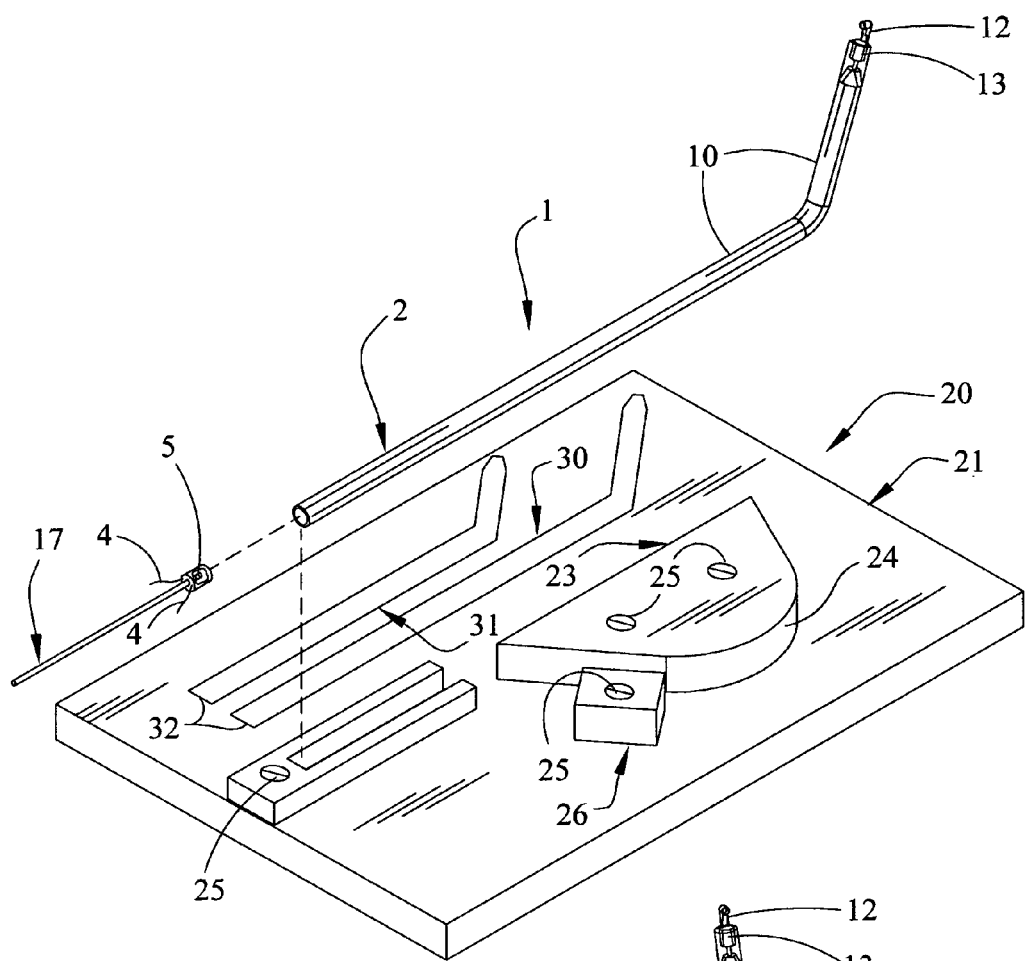
FIG. 6 is a perspective view of a first jig for measuring and bending a neon light tube into the configurations illustrated in FIGS. 1, 3 and 5.

Referring initially to FIGS. 1, 3 and 5 of the drawings, a first neon light spark plug connector is illustrated as reference numeral 1 and includes a first shaped neon light tube 2 of selected length and shape, having a coil end 3 and a spark plug end 11. The coil end 3 of the first shaped neon light tube 2 includes coil end wiring 4 (FIG. 5) that extends from the internal coil end electrode 5, sealed in the corresponding end of the first shaped neon light tube. A coil connector or coil clip 9 is attached to the coil end wiring 4 extending from the coil electrode 5 and is designed for removable electrical attachment to a coil terminal (not illustrated) of the coil 36, mounted on the motorcycle engine 34, as further illustrated in FIG. 1. A coil end boot 7 is fitted over a coil end sleeve 6 that tightly covers the coil clip 9 and the coil end 3 of the first shaped neon light tube 2 and in a preferred embodiment, the coil end boot 7 is characterized by multiple coil end boot corrugations 8, which are designed to help absorb the vibration of the motorcycle engine 34 when the first neon light spark plug connector 1 is installed as illustrated in FIG. 1.

At the spark plug end 11 of the first shape neon light tube 2, the spark plug end wiring 12 (FIG. 5) extends from a sealed spark plug end electrode 13 and is secured to a spark plug connector or spark plug clip 16 for attachment to the spark plug terminal (not illustrated) of a spark plug 37, as illustrated in FIG. 1. A plastic spark plug end sleeve 14 may be typically shrink-fitted over the spark plug clip 16 and the spark plug end 11 of the first shape neon light 5 and spark plug end electrode 13, coil connector or clip 9 and spark plug connector or clip 16 elements, as well as the connecting and protective coil end sleeve 6 and spark plug end sleeve 14 and the coil end boot 7 and spark plug end boot 15 elements, as the first shape neon light tube 2, illustrated in FIGS. 1, 3 and 5. Either one or both of the differently-shaped first and second neon light plug connectors 1 and 18 may be installed and used on the motorcycle engine 34, as desired, both connectors of which are illustrated in functional configuration in FIG. 1.

Figure 7:
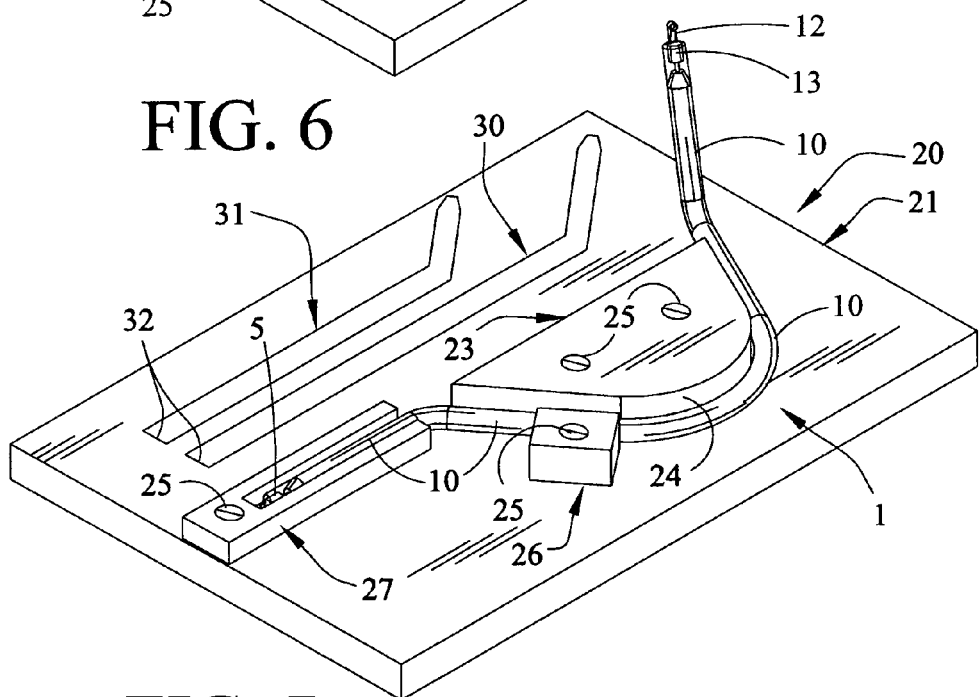
FIG. 7 is a perspective view of the jig illustrated in FIG. 6, more particularly illustrating bending of a neon light tube into the configuration illustrated in FIGS. 1, 3 and 5.

A first neon light tube jig 20 is illustrated in FIGS. 6 and 7 and includes a jig base 21, which is typically constructed of wood or other rigid material, including fiberglass, plastic and the like, and includes a first shape neon light tube length outline 30, shaped to define the length and configuration of the first shape neon light tube 2, and is terminated by a cut indicator line 32. A shaping block 23 is either formed integrally with the jig base 21, as in the case of a molded plastic jig, or includes a separate element such as a wooden shaping block 23 that may be typically attached to the jig base 21 by means of block screws 25. The shaping block 23 is characterized by a curved block surface 24 that defines a primary bend configuration, typically at least two bends, and most preferably three bends, of the first shape neon light tube 2 illustrated in FIG. 7, as further hereinafter described. A spacer block 26 is provided in the first neon light tube jig 20 in spaced-apart relationship with respect to the shaping block 23 and a first end block 27 is spaced-apart from the spacer block 26 and is also spaced from the shaping block 23, for purposes which will also be hereinafter further described.

A second shaped neon light tube length outline 31 is also typically provided on the jig base 21 of the first neon light tube jig 20 and also has a cut indicator line 32 at one end for determining the desired length of the second shaped neon light tube 19. Alternatively, the second shaped neon light tube length outline 31 can be placed on a second neon light tube 20a, illustrated in FIGS. 8 and 9, as desired. The second jig base 21a for shaping the second neon light tube 19 is provided in a second neon light tube jig 20a and further includes a second shaping block 29a at one end thereof, which is typically formed integrally with the second jig base 21a in the same manner as the first shaping block 23, or may be shaped of wood and attached to the second jig base 21a, typically using additional block screws 25.

Under circumstances where it is desired to shape a first neon light spark plug connector 1 into a configuration that will extend between the coil 36 position and the spark plug 37 location and around the various protrusions of a motorcycle engine 34 (FIG. 1), a straight mercury vapor or neon light tube 10 of selected color is initially chosen and a spark plug end electrode 13 is attached to one end of the neon light tube 10, after heating the end of the spark plug end electrode 13 and the receiving end of the neon light tube 10. After bending, measuring and cutting the neon light tube 10 at the cut indicator line 32 on the first shaped neon light length outline tube 32 as illustrated in FIG. 6, an air tube (not illustrated) is typically extended into the opposite, cut end of the neon light tube 10 from the spark plug end electrode 13 and air is blown through the neon light tube 10 as the neon light tube 10 is further heated and shaped to conform to the bends in the jig base 21, as illustrated in FIG. 7. The open end of the neon light tube 10 is then trimmed at the first end block 27 to define the desired length of the first shaped neon light tube 2. A heated vacuum glass line 17 is then attached to the open heated and cut end of the neon light tube 10 and the vacuum glass line 17 and includes a coil end electrode 5 on one end, as further illustrated in FIG. 6. The first shaped neon light tube 2 is then evacuated through the vacuum glass line 17 and is heat-sealed, and the vacuum glass line 17 is then cut away, with the coil end wiring 4 connected to the sealed coil end electrode 5, projecting through the coil end 3 and the spark plug end wiring 12 extending from the sealed spark plug end electrode 13 through the spark plug end 11, as illustrated in FIG. 5. The first shaped neon light tube 2 thus defines first, second and third bends, formed by heating and positioning it between the shaping block 23 and the spacer block 26, with the coil end 3 superimposed in or against the first end block 27, as described above and illustrated in FIG. 7 of the drawings. This procedure thus shapes the neon light tube 10 into the configuration of the first shaped neon light tube 2 and facilitates removal of the shaped first shaped neon light tube 2 from the shaping block 23 in the desired configuration after cooling, to span the distance between the coil 36 and spark plug 37 on the motorcycle engine 34 as illustrated in FIG. 1. A coil clip 9 is then attached to the coil end wiring 4 at the coil end 3 of the first shaped neon light tube 2 and the spark plug end wire 12 is then attached to the spark plug clip 16, as further illustrated in FIG. 5.

In a preferred embodiment of the invention a plastic coil end sleeve 6 is fitted over the coil end 3, the coil end wiring 4 and the secured end of the coil clip 9 and is heated to shrink-fit the coil end sleeve 6 tightly over these elements (FIGS. 3 and 5). A coil end boot 7 is then slip-fitted over the coil end 3 and the coil end sleeve 6. Similarly, a spark plug end sleeve 14 is typically slipped over the spark plug end 11 of the first shaped neon light tube 2 and over the spark plug clip 16 and is also heat-seated in place, typically using a hot air blower. One end of a spark plug end boot 15 is then positioned in a slip-fit over the spark plug end 11 and the spark plug end sleeve 14 to complete the first shaped neon light tube 2.

Figure 8:
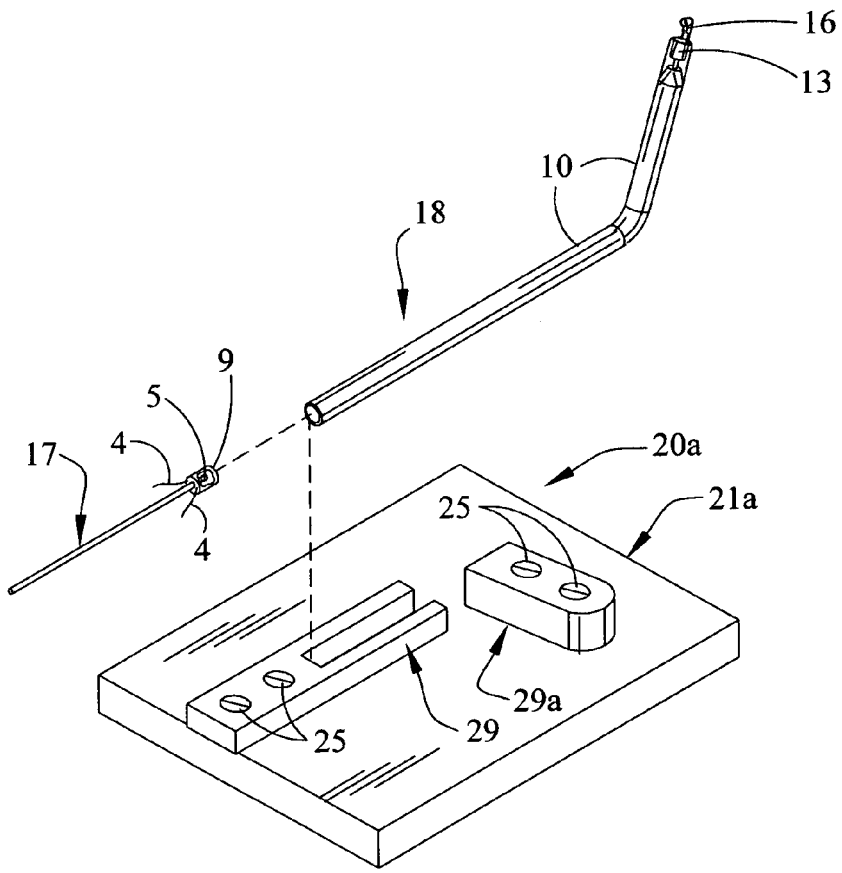
FIG. 8 is a perspective view of a second jig for bending a neon light tube into the configurations illustrated in FIGS. 1, 2 and 4.
Figure 9:
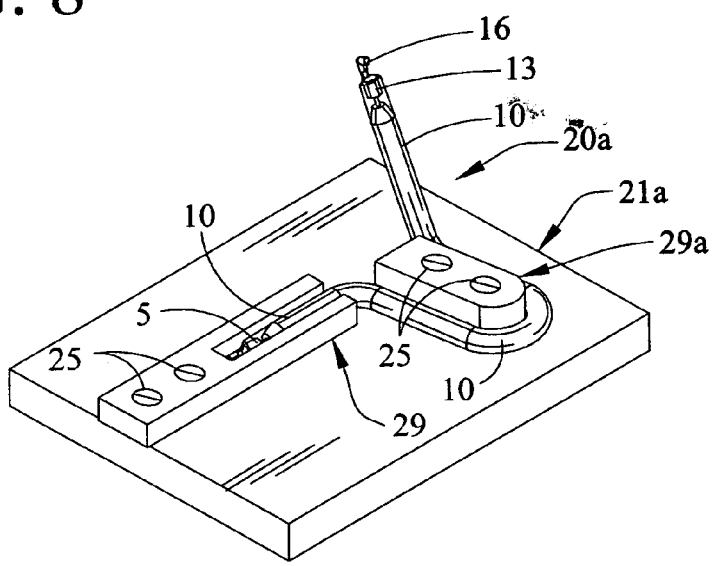
FIG. 9 is a perspective view of the jig illustrated in FIG. 8, more particularly illustrating bending of a neon light tube into the configurations illustrated in FIGS. 1, 2 and 4.

If used, the second shaped neon light tube 19 is similarly constructed, using a neon light tube 10 measured against the second shaped neon light tube length outline 31 on the jig base 21, illustrated in FIG. 6 and shaped in the second neon light tube jig 20a illustrated in FIGS. 8 and 9. Accordingly, a spark plug end electrode 13 is thermally added to the second shaped neon light tube 19 as described above with respect to the first shaped neon light tube 2, while the coil end electrode 5 is later added by means of a vacuum glass line 17, as further heretofore described after the second shaped neon light tube 19 is shaped around the second shaping block 29a, cut at the second end block 29 in the second neon light tube jig 20a, evacuated and sealed. The vacuum gas line 17 is then removed. The coil clip 9 is attached to the protruding coil end wiring 4 and the spark plug clip 16 attached to the projecting ends of the spark plug end wiring 12, as illustrated in FIG. 4 and as described above with respect to the first neon light spark plug connector 1 illustrated in FIG. 5. A coil end sleeve 6 is typically added to the coil end 3, a spark plug end sleeve 14 added to the spark plug end 11 of the second shaped neon light tube 10, and a coil end boot 7 and spark plug end boot 15 are then added to the coil end 3 and spark plug end 11, as further illustrated in FIGS. 2 and 4 of the drawings.

It will be further appreciated that neon light spark plug/coil connectors of any desired color, length and shape for any engine can be constructed using a jig of suitable design.

While the preferred embodiments of the invention have been described above, it will be recognized and understood that various modifications may be made in the invention and the appended claims are intended to cover all such modifications which may fall within the spirit and scope of the invention.

Having described my invention with the particularly set forth above, what is claimed is:

1. A neon light spark plug/coil connector for an engine comprising a shaped, continuous neon light tube having a selected color, a coil connector electrically connecting one end of said neon light tube to the coil; a coil boot provided on said one end of said neon light tube at the coil for covering said coil connector; a spark plug connector electrically connecting the opposite end of said neon light tube to the spark plug; and a spark plug boot provided at said opposite end of said neon light tube at the spark plug for covering said spark plug connector.

2. The neon light spark plug/coil connector of claim 1 comprising a first sleeve provided on said one end of said neon light tube under said coil boot for covering said coil connector and a second sleeve provided on said opposite end of said neon light tube under said spark plug boot for covering said spark plug connector.

3. The neon light spark plug/coil connector of claim 1 comprising at least one flexible corrugation provided in said coil boot for attenuating vibration in said neon light tube from the engine.

4. The neon light spark plug/coil connector of claim 1 comprising:
   (a) a first sleeve provided on said one end of said neon light tube under said coil boot for covering said coil connector and a second sleeve provided on said opposite end of said neon light tube under said spark plug boot for covering said spark plug connector; and (b) at least one flexible corrugation provided in said coil boot for attenuating vibration in said neon light tube from the engine.

5. The neon light spark plug/coil connector of claim 1 wherein said neon light tube comprises a neon tube or a mercury vapor tube and is configured to define at least two bends for connecting with the spark plug and the coil of the engine.

6. The neon light spark plug/coil connector of claim 5 wherein said at least two bends comprises three bends provided in said neon light tube.

7. The neon light spark plug/coil connector of claim 5 comprising a coil connector electrically connecting one end of said neon light tube to the coil; a coil boot provided on said one end of said neon light tube at the coil and a first sleeve provided on said one end of said neon light tube for covering said coil connector; a spark plug connector electrically connecting the opposite end of said neon light tube to the spark plug; and a spark plug boot provided at said opposite end of said neon light tube at the spark plug for covering said spark plug connector.

8. The neon light spark plug/coil connector of claim 7 comprising a second sleeve provided on said opposite end of said neon light tube under said spark plug boot for covering said spark plug connector.

9. The neon light spark plug/coil connector of claim 6 comprising:
   (a) a coil connector electrically connecting one end of said neon light tube to the coil; a coil boot provided on said one end of said neon light tube at the coil and a first sleeve provided on said one end of said neon light tube for covering said coil connector; a spark plug connector electrically connecting the opposite end of said neon light tube to the spark plug; and a spark plug boot provided at said opposite end of said neon light tube at the spark plug for covering said spark plug connector; and
   (b) a second sleeve provided on said opposite end of said neon light tube under said spark plug boot for covering said spark plug connector.

10. The neon light spark plug/coil connector of claim 5 comprising at least one flexible corrugation provided in said coil boot for attenuating vibration in said neon light tube from the engine.

11. The neon light spark plug/coil of claim 6 comprising:
   (a) a coil connector electrically connecting one end of said neon light tube to the coil and a coil boot provided on said one end of said neon light tube at the coil for covering said coil connector; a spark plug connector electrically connecting the opposite end of said neon light tube to the spark plug and a spark plug boot provided at said opposite end of said neon light tube at the spark plug for covering the said spark plug connector; and at least one flexible corrugation provided in said coil boot for attenuating vibration in said neon light tube from the engine; and
   (b) a first sleeve provided on said one end of said neon light tube under said coil boot for covering said coil connector and a second sleeve provided on said opposite end of said neon light tube under said spark plug boot for covering said spark plug connector.

12. A light tube connector for connecting a coil and a spark plug in a motorcycle engine, said light tube connector comprising a continuous light tube having a selected color and shape to join the coil and the spark plug; a coil connector provided on one end of said light tube for electrically connecting said one end of said light tube to the coil and a spark plug connector provided on the opposite end of said light tube from said one end for electrically connecting said opposite end of said light tube to the spark plug; a coil boot provided on said one end of said light tube at the coil for covering such coil connector and a spark plug boot provided on said opposite end of said light tube at the spark plug for covering said spark plug connector.

13. The light tube connector of claim 12 comprising a first sleeve provided on said one end of said light tube for covering said coil connector and a second sleeve provided on said opposite end of said light tube for covering said spark plug connector.

14. The light tube connector of claim 12 comprising at least one flexible corrugation provided at least in said coil boot for attenuating vibration in said light tube from the engine.

15. A neon light tube connector for electrically connecting a coil to a spark plug in a motorcycle engine, said neon light tube connector comprising a continuous neon light tube having a selected color and sized and shaped to span the distance between the coil and the spark plug; a coil connector provided on one end of said neon light tube for electrically connecting said one end of said neon light tube to the coil; a spark plug connector provided on the opposite end of said neon light tube from said one end for connecting said opposite end of said neon light tube to the spark plug; a coil boot provided on said one end of said neon light tube at the coil for covering said coil connector; a spark plug boot provided on said opposite end of said neon light tube at the spark plug for covering said spark plug connector; a first sleeve provided on said one end of said neon light tube under said coil boot for covering said coil connector and a second sleeve provided on said opposite end of said neon light tube under said spark plug boot for covering said spark plug connector.

16. The neon light tube connector of claim 15 comprising at least one flexible corrugation provided in said coil boot for attenuating vibration in said neon light tube from the engine.

* * * * *